(12) United States Patent
Nakamura

(10) Patent No.: US 7,072,266 B2
(45) Date of Patent: Jul. 4, 2006

(54) MULTIPLE-AREA-COMPATIBLE DISK REPRODUCING DEVICE

(75) Inventor: Yoshitaka Nakamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 784 days.

(21) Appl. No.: 10/275,010

(22) PCT Filed: Mar. 15, 2001

(86) PCT No.: PCT/JP01/02070
§ 371 (c)(1),
(2), (4) Date: Oct. 31, 2002

(87) PCT Pub. No.: WO02/075737
PCT Pub. Date: Sep. 26, 2002

(65) Prior Publication Data
US 2003/0142604 A1 Jul. 31, 2003

(51) Int. Cl.
*G11B 20/10* (2006.01)

(52) U.S. Cl. ............... 369/53.41; 369/59.25; 369/47.21

(58) Field of Classification Search ............ None
See application file for complete search history.

(56) References Cited

U.S. PATENT DOCUMENTS

| 5,778,257 | A * | 7/1998 | Tsukatani et al. ......... 369/275.3 |
| 6,463,022 | B1 * | 10/2002 | Ito et al. .................. 369/30.03 |
| 6,621,783 | B1 * | 9/2003 | Murata ..................... 369/53.31 |
| 6,631,107 | B1 * | 10/2003 | Ito et al. ................... 369/47.1 |
| 6,671,249 | B1 * | 12/2003 | Horie ....................... 369/53.21 |
| 6,901,210 | B1 * | 5/2005 | Heo et al. .................. 386/125 |

FOREIGN PATENT DOCUMENTS

| JP | 10-233079 A | 9/1998 |
| JP | 10-233080 A | 9/1998 |
| JP | 2000-285461 A | 10/2000 |

* cited by examiner

Primary Examiner—Thang V Tran
(74) Attorney, Agent, or Firm—Birch, Stewart, Kolasch, and Birch, LLP

(57) ABSTRACT

A multisession compatible disk player including: a multisession decision portion (6) that decides whether a disk has plural sessions based on session format information recorded in a lead-in area of a first session on the disk; a disk format decision portion (10) that decides whether the disk is a read-only disk based on disk format information recorded in the lead-in area of the first session on the disk; a disk type decision portion (7) that decides the type of the disk based on the results of decision by the multisession decision portion and the disk format decision portion; and a control portion (9) that controls the playback of the disk based on the result of decision by the disk type decision portion.

13 Claims, 9 Drawing Sheets

MULTIPLE-AREA-COMPATIBLE DISK REPRODUCING DEVICE

TECHNICAL FIELD

The present invention relates to a multisession compatible disk player that plays back a multisession disk having recorded thereon music data and other kind of data.

BACKGROUND OF THE INVENTION

With the recent widespread use of a writable drive for a computer specific CD-R (CD recordable)/CD-RW (CD rewritable), it has become possible to easily prepare a disk intended for home use. This permits preparation of a traditionally inconceivable multisession disk that has plural sessions with music or some other data recorded in each of them; hence, there is a demand for a multisession compatible disk player capable of playing back all pieces of music data recorded in the plural sessions.

FIG. 1 is a block diagram to depict the configuration of a conventional multisession compatible disk player. In FIG. 1, reference numeral 1 denotes a disk to be played back, and 1a denotes a recording session.

The recording session 1a is composed of first, second, . . . , and last sessions, each consisting of a lead-in area, a program area and a lead-out area. And contents information recorded in the lead-in area contains identification information about the recording format of the disk 1. In the first session there are recorded, as the identification information, session format information indicating whether the disk 1 is multisession or not, and disk format information indicating that the disk 1 is a read-only disk. In each of the first and subsequent sessions there are recorded the current session data format indicating that the current session has recorded therein music data or some other data, for example, ROM data for CD-ROM use, information about the next session contents information starting position, and so forth.

The disk 1, which has plural sessions, each consisting of the lead-in, program and lead-out areas as shown in FIG. 1, is a multisession compatible disk, whereas the disk 1 having one session is a single session disk.

Reference numeral 2 denotes a signal readout portion for reading out of the disk 1 a signal containing contents information; 3 denotes a signal processing portion that decodes the signal read out by the signal readout portion 2 and converts the decoded signal to data processable in the subsequent step; and 4 denotes a microprocessor that performs various processing, makes various decisions and controls the playback of the disk based on the signal processed by the signal processing portion 3.

In the microprocessor 4, reference numeral 5 denotes an identification information processing portion that identifies each piece of identification information contained in the contents information decoded by the signal processing portion 3; 6 denotes a multisession decision portion that decides whether the disk 1 is multisession or not based on session format information in the identification information identified by the identification information processing portion 5 which is recorded in the lead-in area of the first session on the disk; 7 denotes a disk type decision portion that decides the type of the disk 1 based on the result of decision by the multisession decision portion 6; 8 denotes a contents readout processing decision portion that decides the method for contents readout processing; and 9 denotes a control portion that controls the playback method based on the result of decision by the disk type decision portion 7 and controls the readout of contents information for each session based on the result of decision by the contents readout processing decision portion 8.

Next, the operation of the prior art example will be described below.

FIG. 2 is a flowchart to show the procedure for disk decision processing in the conventional multisession compatible disk player. In step ST11 the operation for playing back the disk 1 begins with reading out contents information in the first session by the signal readout portion 2, followed by decoding the read-out contents information by the signal processing portion 3 and then by identifying each piece of identification information contained in the decoded contents information by the identification information processing portion 5.

In step ST12 the multisession decision portion 6 decides whether the disk 1 has plural sessions based on the session format information in the identification information identified by the identification information processing portion 5 which is recorded in the lead-in area of the first session on the disk.

When it is decided by the plural session decision portion 6 in step ST12 that the disk has only one session, the procedure goes to step ST13, in which the disk type decision portion 7 decides that the disk 1 is a single session disk. When it is decided instep ST12 that the disk has plural sessions, the disk type decision portion decides in step ST14 that the disk 1 is a multisession disk.

In step ST15 the disk type decision portion 7 finishes the processing for deciding the type of the disk 1, and the control portion effects control for playing back the single or plural sessions according to the result of decision by the disk type decision portion.

FIG. 3 is a flowchart to show the contents information readout procedure in the conventional multisession compatible disk player. Steps ST11 to ST14 are the same as those ST11 to ST14 in FIG. 2.

When it is decided by the disk type decision portion 7 in step ST13 that the disk 1 is a single session disk, the contents readout processing decision portion 8 terminates the contents information readout processing since the disk has no contents information of the subsequent sessions, and the control portion 9 controls the signal readout portion 2 via the signal processing portion 3 to start the playback of the program area on the disk 1.

On the other hand, when it is decided by the disk type decision portion 7 in step ST14 that the disk 1 is a multisession disk, the procedure goes to step ST16, in which the contents readout processing decision portion 8 obtains information about the contents information starting position from the identification processing portion 5 and sends the information to the control portion 9, which, in turn, controls the signal readout portion 2 via the signal processing portion 3 to move to the next session contents position to read out contents information about the next session. During the movement of the signal readout portion 2 to the position where to start the readout of the contents information, the signal processing portion 3 sends information about an error between the current and target positions of the signal readout portion to the control portion 9; based on the error information sent thereto the control portion 9 controls the movement of the signal readout portion. And, as is the case with the first session contents information readout processing in step ST11, the signal processing portion 3 decodes the contents information and the identification information processing portion 5 identifies each piece of the identification information contained in the decoded contents information.

In the case where based on the information about the position of starting the next session contents information identified by the identification information processing portion 5 the contents readout processing decision portion 8 decides in step ST17 that the current session is followed by the next session, steps ST16 and ST17 are repeated until the current session is no longer followed by the next session. When the identification information processing portion 5 does not identify the information about the next session contents information starting position and consequently the contents readout processing decision portion 8 decides in step ST17 that the current session is not followed by the next session, the procedure goes to step ST18, in which the contents readout processing decision portion 8 terminates the contents information readout processing and the control portion 9 and causes the control portion 9 to start the playback of the program area on the disk 1.

Because of its configuration described above, the conventional multisession compatible disk player cannot distinguish between the multisession disk and a disk marketed under the name of an enhanced music CD, which has sessions of recording formats so specified as to record music data in the first session and some other data in the second session with no distinction from the single session disk—this gives rise to a problem that the conventional disk player inevitably plays back the data recorded in the second session as well as the data recorded in the first session as in the case of playing back the multisession disk.

Further, in the case of the multisession disk, since the data type indicating whether the recorded data music data or some other data is recorded in the contents information about individual sessions, it is impossible to decide which type of data is recorded in which session until contents information about all the sessions involved is read out; furthermore, in the case of the enhanced music CD having sessions of specified recording formats, too, it is necessary to read out the contents information about the second session, raising a problem of a delay in the start of playback.

The present invention is intended to solve such problems as mentioned above and has for its object to provide a multisession compatible disk player that based on first session contents information read out at playback time, decides that the disk to be played back is the enhanced music CD, in particular, and plays it back in the same manner as in the case of the single session disk.

Another object of the present invention is to provide a multisession compatible disk player that, in the case of the disk being decided as the enhanced music CD based on the result of decision, does not read out the second session contents information but reads out the first session contents information alone as in the case of an ordinary single session disk, there by starting the playback within about the same time as that for the single session disk.

DISCLOSURE OF THE INVENTION

The multisession compatible disk player according to the present invention includes: a signal readout portion that reads out contents information containing identification information about the recording format of a disk recorded in a lead-in area of a first session on a disk; a signal processing portion that decodes contents information read out by said signal readout portion; an identification information processing portion that identifies each piece of the identification information contained in the contents information decoded by said signal processing portion; a multisession decision portion that decides whether the disk has plural sessions based on a session format information in the identification information identified by the identification information processing portion which is recorded in the lead-in area of the first session on the disk; a disk format decision portion that decides whether the disk is a read-only disk based on a disk format information in the identification information identified by said identification information processing portion which is recorded in the lead-in area of the first session on the disk; a disk type decision portion that decides a type of the disk based on results of the decision by said multisession decision portion and said disk format decision portion; and a control portion that controls a playback of the disk based on a result of decision by said disk type decision portion.

This brings an effect that a playback corresponding to the type of the disk can be realized.

The multisession compatible disk player according to the present invention is characterized by that the disk format decision portion decides that the disk is a single session disk when the multisession decision portion decides that the disk has no plural sessions.

This brings an effect that a playback corresponding to a single session disk can be realized.

The multisession compatible disk player according to the present invention is characterized by that the disk type decision portion decides that the disk is a disk based on particular specifications when the multisession disk decision portion decides that the disk has plural sessions and the disk format decision portion decides that the disk is a read-only disk.

This brings an effect that a playback corresponding to a disk based on particular specifications can be realized.

The multisession compatible disk player according to the present invention is characterized by that the disk type decision portion decides an enhanced music CD whose formats of respective sessions are identified as a disk based on particular specifications.

This brings an effect that the enhanced music CD can be played back in the same manner as in the case of the single session disk but in distinction from other multisession disks.

The multisession compatible disk player according to the present invention is characterized by that the disk type decision portion decides that the disk is a multisession disk when the multisession decision portion decides that the disk has plural sessions and the disk format decision portion decides that the disk is not a read-only disk.

This brings an effect that a playback corresponding to a multisession disk can be realized.

The multisession compatible disk player according to the present invention further includes a contents readout processing decision portion that causes the control portion to control a process for readout of contents information containing identification information, which is recorded in the second and subsequent sessions on the disk based on the result of decision by the disk type decision portion.

This brings an effect that control of the readout of contents information of the second and subsequent sessions corresponding to the type of disk can be realized.

The multisession compatible disk player according to the present invention is characterized by that when the multisession decision portion decides that the disk has no plural sessions, the disk format decision portion decides that the disk is a single session disk, and the contents readout processing decision portion decides that it is unnecessary to read out contents information in the subsequent sessions and causes the control portion to terminate the contents information readout process.

This brings an effect that the player can terminates the process for reading out contents information in the subsequent sessions and hence starts the playback of the single session disk in a short time.

The multisession compatible disk player according to the present invention is characterized by that when the multisession decision portion decides that the disk has plural sessions and the disk format decision portion decides that the disk is a read-only disk, the disk type decision portion decides that the disk is a disk based on particular specifications, and the contents readout processing decision portion decides that it is unnecessary to read out contents information in the subsequent sessions and causes the control portion to terminate the contents information readout process.

This brings an effect that the player can terminates the process for reading out contents information in the subsequent sessions corresponding to the disk based on particular specifications and hence starts the playback with waiting time similar to the single session disk in a short time.

The multisession compatible disk player according to the present invention is characterized by that when the multisession decision portion decides that the disk has plural sessions and the disk format decision portion decides that the disk is not a read-only disk, the disk type decision portion decides that the disk is a multisession disk and the contents readout processing decision portion causes the control portion to control the process for reading out contents information in the subsequent sessions.

This brings an effect that readout of contents information in each session corresponding to the multisession disk can be realized.

The multisession compatible disk player according to the present invention further includes a first session data type decision portion that decides whether data recorded in the first session is music data or some other data based on a data type in the identification information identified by the identification information processing portion which is recorded in the lead-in area of the first session on the disk; and characterized by that the disk type decision portion decides the type of the disk based on the result of decision by the multisession decision portion, the result of decision by the disk format decision portion and the result of decision by said first session data type decision portion.

This brings an effect that control of the process for reading out contents information in the second and subsequent sessions according to the type of the disk can be realized.

The multisession compatible disk player according to the present invention is characterized by that when the multisession decision portion decides that the disk has no plural sessions, the disk format decision portion decides that the disk is a single session disk and the contents readout processing decision portion decides that it is unnecessary to read out contents information in the subsequent sessions and causes the control portion to terminate the contents information readout process.

This brings an effect that the player can terminate the process for reading out contents information in the subsequent sessions and hence start the playback of the disk in a short time as the single session disk.

The multisession compatible disk player according to the present invention is characterized by that the disk type decision portion decides that the disk is a disk based on particular specifications, and the contents readout processing decision portion decides that it is unnecessary to read out contents information in the subsequent sessions and causes the control portion to terminate the contents information readout process when the multisession decision portion decides that the disk has plural sessions, the disk format decision portion decides that the disk is a read-only disk, and the first session data type decision portion decides that data recorded in the first session is music data.

This brings an effect that the player can terminate the process for reading out contents information in the subsequent sessions and hence start the playback of the disk within about the same time as that for an ordinary single session disk.

The multisession compatible disk player according to the present invention is characterized by that the disk type decision portion decides that the disk is a read-only multisession disk, and the contents readout processing decision portion causes the control portion to control the process for reading out contents information in the subsequent sessions when the multisession decision portion decides that the disk has plural sessions, the disk format decision portion decides that the disk is a read-only disk, and the first session data type decision portion decides that data recorded in the first session is not music data but some other data.

This brings an effect that the player can perform reading out contents information in the respective sessions corresponding to the read-only multisession disk.

BEST MODE FOR CARRYING OUT THE INVENTION

To facilitate a better understanding of the present invention, a description will be given below, with reference to the accompanying drawings, of the best mode for carrying out the invention.

Embodiment 1

Figure 1:
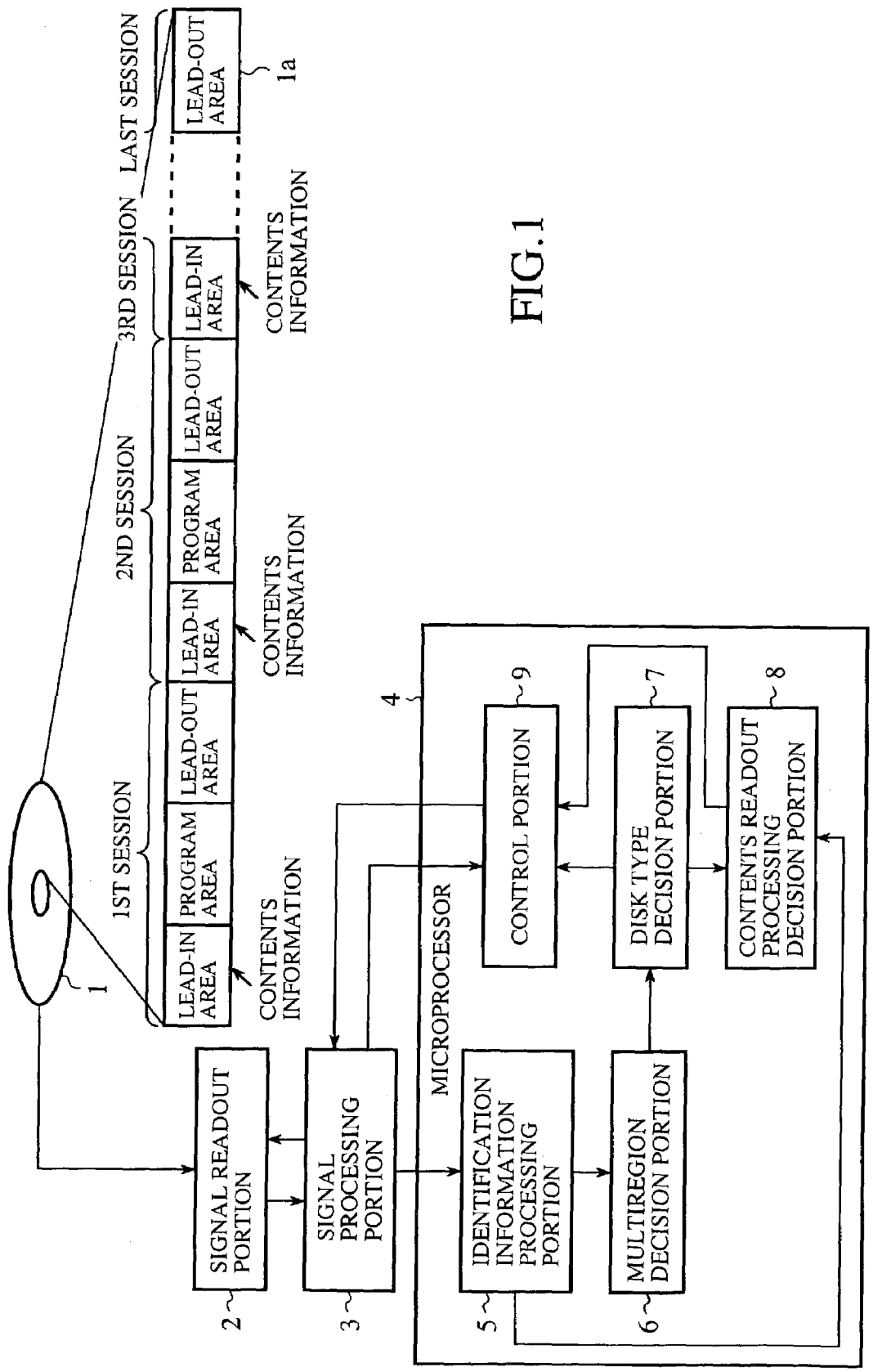
FIG. 1 is a block diagram to show the configuration of a conventional multisession compatible disk player.
Figure 2:
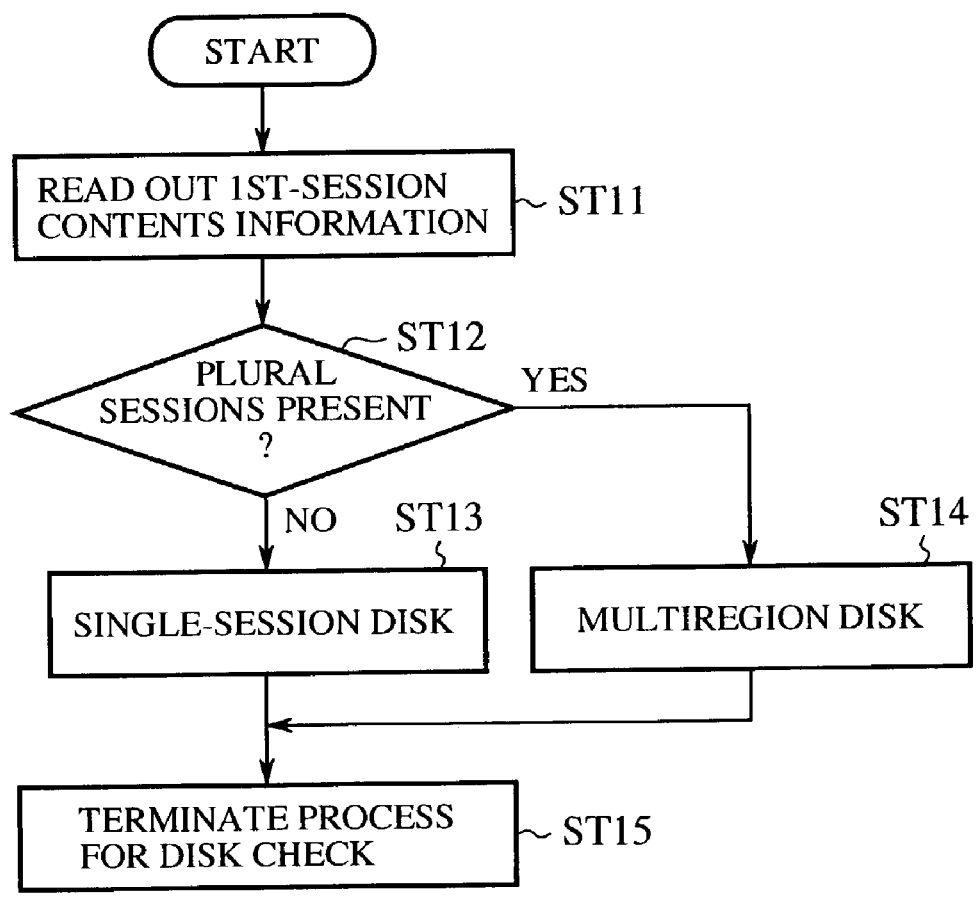
FIG. 2 is a flowchart to show a disk decision procedure in the conventional multisession compatible disk player.
Figure 3:
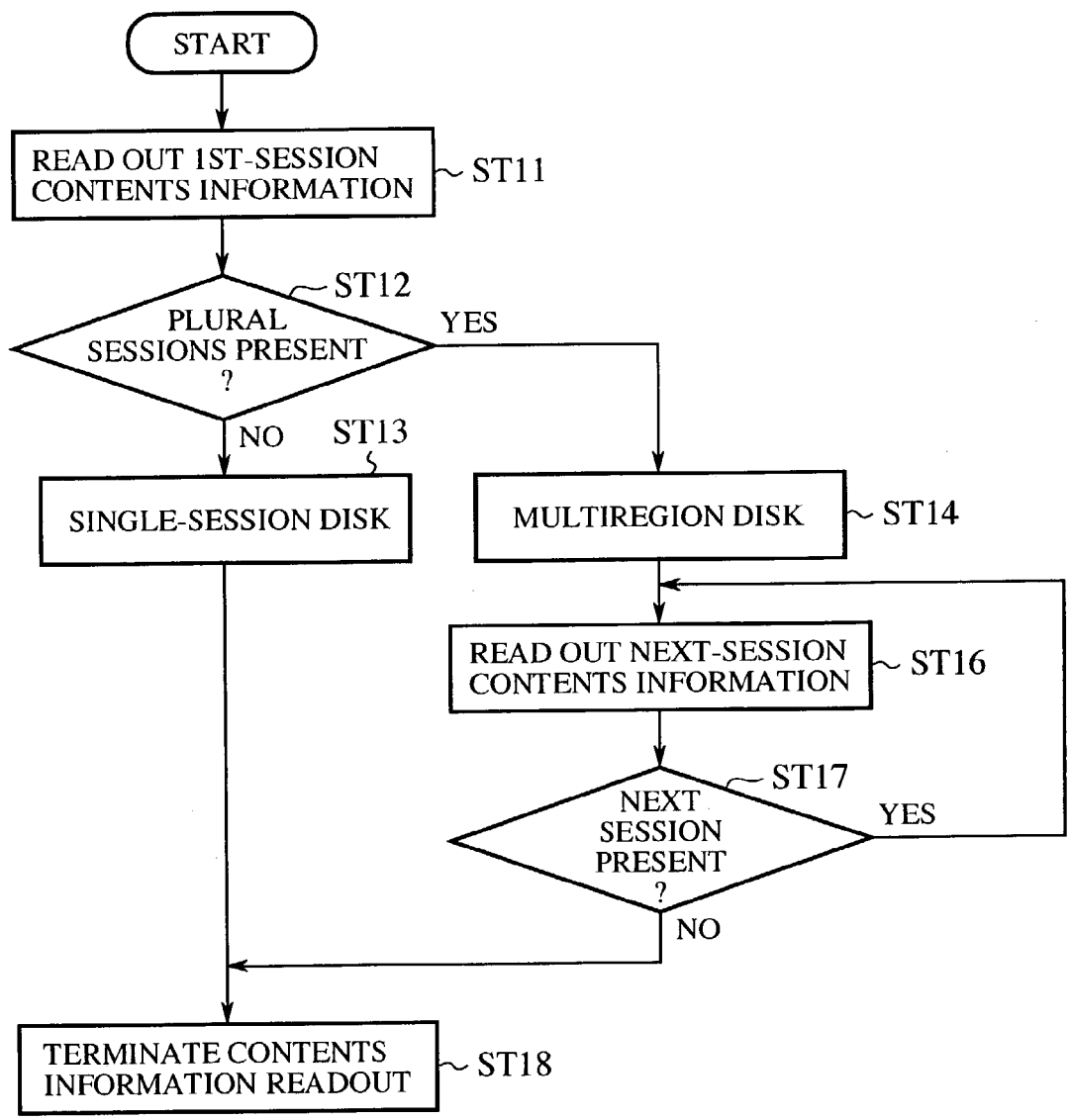
FIG. 3 is a flowchart to show contents information readout procedure in the conventional multisession compatible disk player.
Figure 4:
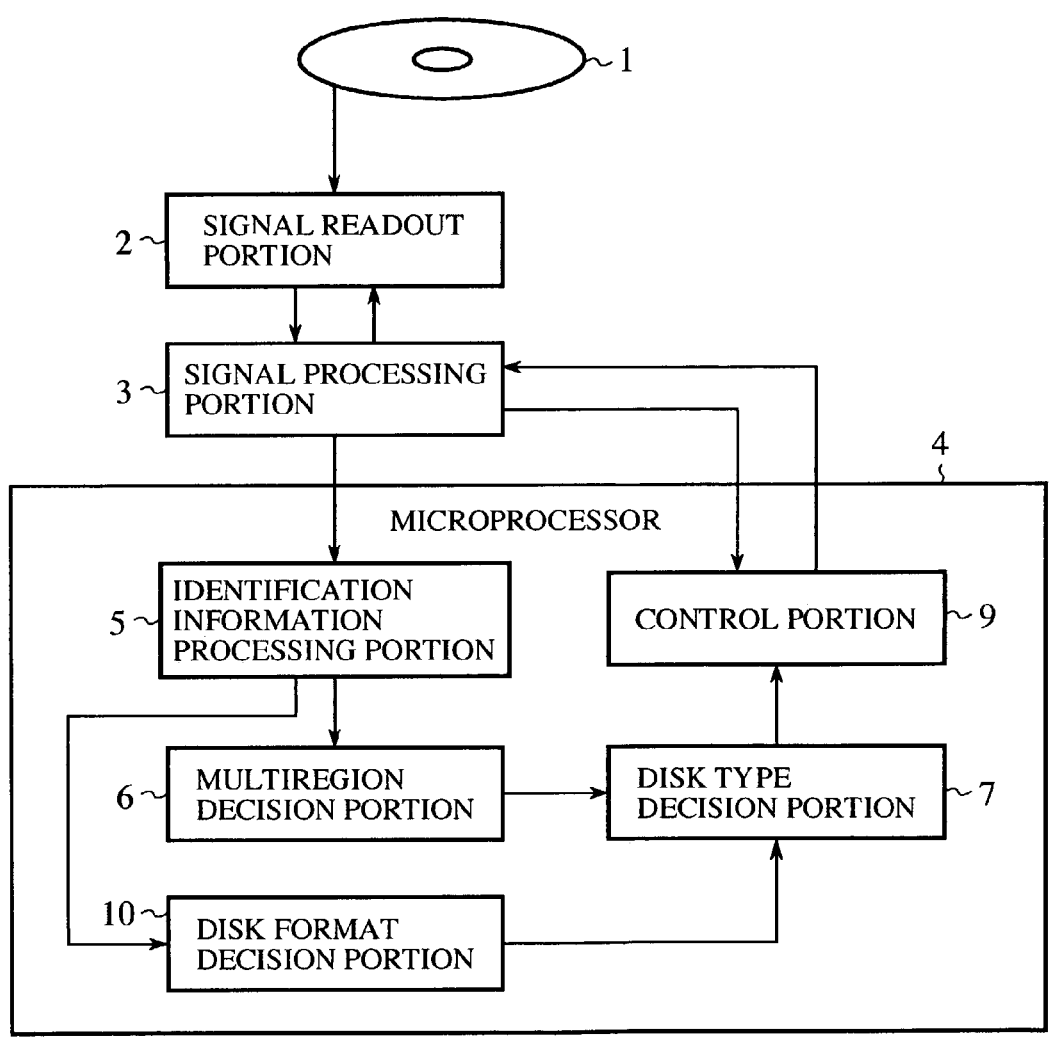
FIG. 4 is a block diagram to illustrate the configuration of a multisession compatible disk player according to embodiment 1 of the present invention.

FIG. 4 is a block diagram to depict the configuration of the multisession compatible disk player according to embodiment 1 of the present invention. In FIG. 4, reference numeral 10 denotes a disk format decision portion that decides whether the disk 1 is a read-only disk or not based on disk format information in the identification information identified by the identification information processing portion 5 which is recorded in the lead-in area of the first session on the disk 1; the disk type decision portion 7 decides the type of the disk based not only on the result of decision by the multisession decision portion 6 but also on the result of decision by the disk format decision portion 10. The other parts corresponding to those in FIG. 1 are identified by the same reference numerals.

Next, the operation of this embodiment will be described below.

Figure 5:
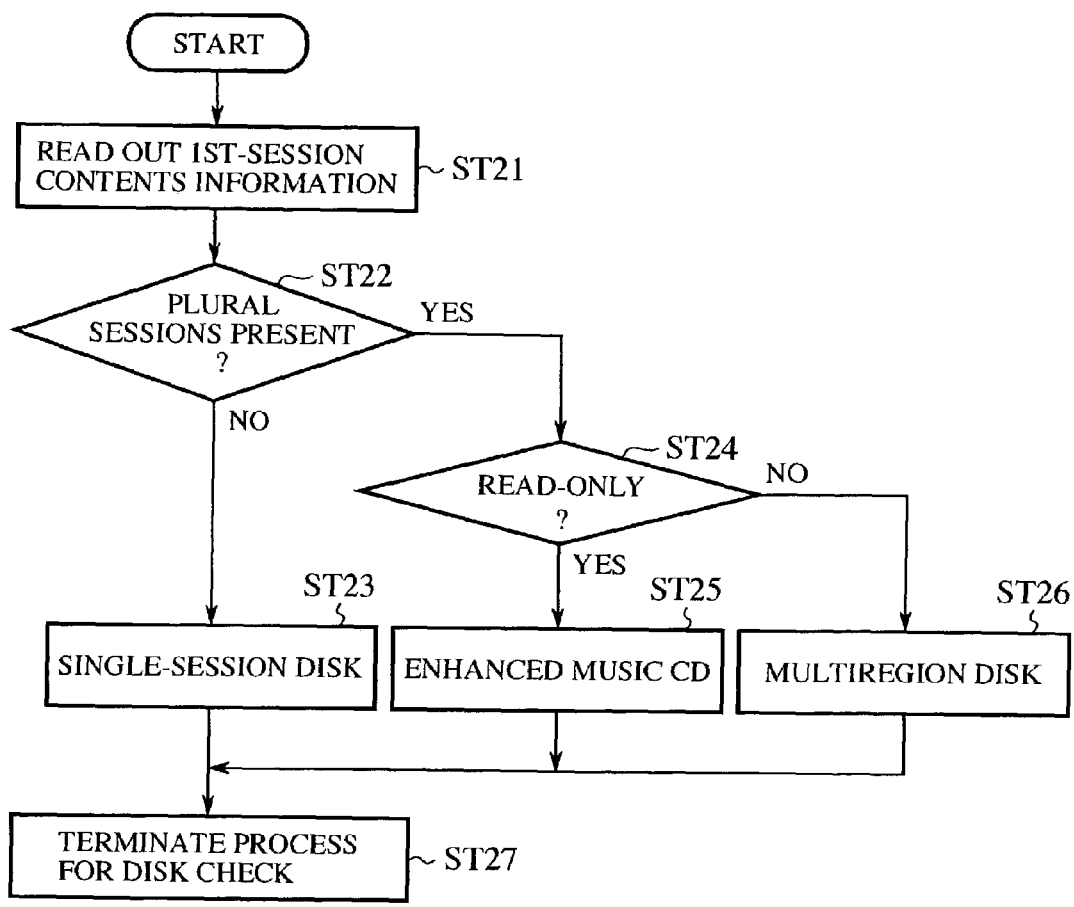
FIG. 5 is a flowchart to show the procedural steps of operation of the multisession compatible disk player according to embodiment 1 of the present invention.

FIG. 5 is a flowchart to show procedural steps of operation of the multisession compatible disk player according to embodiment 1 of the present invention. In step ST21 the playback of the disk 1 begins with readout of first session contents information by the signal readout portion 2, followed by decoding the contents information by the signal processing portion 3, and then by identifying each piece of identification information contained in the decoded contents information by the identification information processing portion 5.

In step ST22 the multisession decision portion 6 decides whether the disk 1 has plural sessions based on session format information in identification information identified by the identification information processing portion 5 which is recorded in the lead-in area of the first session on the disk 1.

When it is decided by the multisession decision portion 6 in step ST22 that the disk has only one session, the disk type decision portion 7 decides that the disk 1 is a single session disk. If it is decided in step ST22 that the disk has plural sessions, then the procedure goes to step ST24, in which the disk format decision portion 10 decides whether the disk 1 is a read-only disk or not based on disk format information in the identification information identified by the identification information processing portion 5 which is recorded in the lead-in area of the first session on the disk 1.

When it is decided by the disk format decision portion 10 in step ST24 that the disk is a read-only disk, the procedure goes to step ST25, in which the disk type decision portion 7 decides that the disk 1 is an enhanced music CD with sessions of specified recording formats based on particular specifications. When it is decided by the disk format decision portion 10 in step ST24 that the disk is not a read-only disk, the procedure goes to step ST26, in which the disk type decision portion 7 decides that the disk 1 is a multisession disk.

In step ST27 the disk type decision portion 7 terminates the procedure of decision on the disk 1 and the control portion 9 controls the playback of the disk 1 based on the result of decision by the disk type decision portion 7. That is, the control portion 9 effects playback control for a single session or plural sessions, depending on whether the disk is the single session or multisession disk, and in the case of the enhanced music CD, the control portion effects the same playback control as that for the single session disk in distinction from other multisession disks.

As described above, according to embodiment 1, when the multisession decision portion 6 decides that the disk 1 has plural sessions and the disk format decision portion 10 decides that the disk 1 is a read-only disk, the disk type decision portion 7 decides that the disk 1 is an enhanced music CD——this enables the enhanced music CD to be distinguished from other multisession disks and played back in the same manner as that for the single session disk.

Embodiment 2

Figure 6:
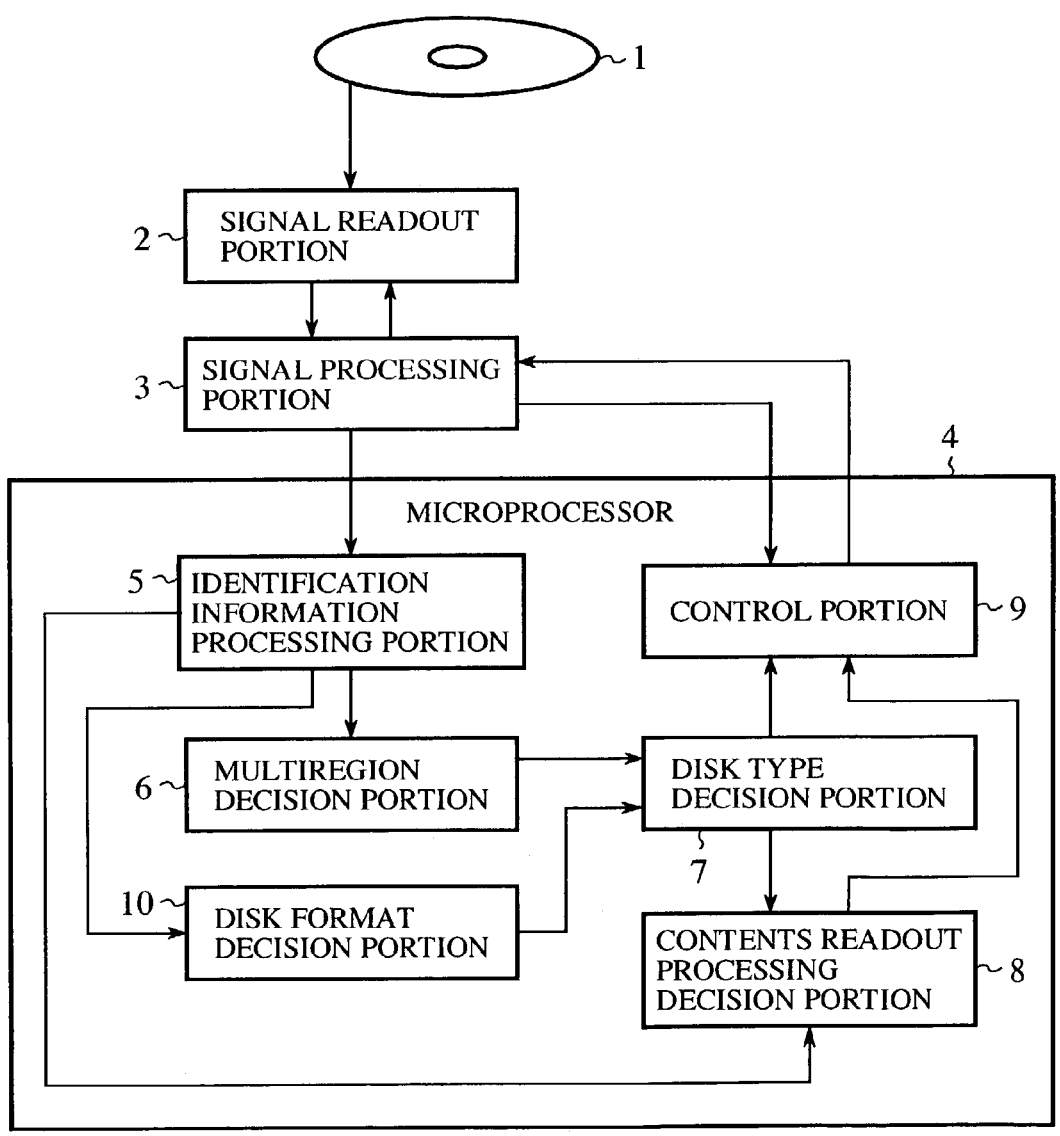
FIG. 6 is a block diagram to illustrate the configuration of a multisession compatible disk player according to embodiment 2 of the present invention.

FIG. 6 is a block diagram to illustrate the configuration of a multisession compatible disk player according to embodiment 2 of the present invention. In FIG. 6 based on the result of decision by the disk type decision portion 7, a contents readout processing decision portion 8 causes the control portion 9 to control the readout of contents information containing identification information recorded in second and subsequent sessions on the disk 1. That is, when the disk type decision portion 7 decides that the disk 1 is a single session disk or enhanced music CD, the contents readout processing decision portion 8 decides that the readout of the contents information in the second and subsequent sessions on the disk 1 is unnecessary, and causes the control portion 9 to terminate the contents information readout process; when the disk type decision portion 7 decides that the disk 1 is a multisession disk, the contents readout processing decision portion causes the control portion to control the readout of the contents information in the second and subsequent sessions on the disk 1. The other parts corresponding to those in embodiment 1 of FIG. 4 are identified by the same reference numerals.

Next, the operation of this embodiment will be described below.

Figure 7:
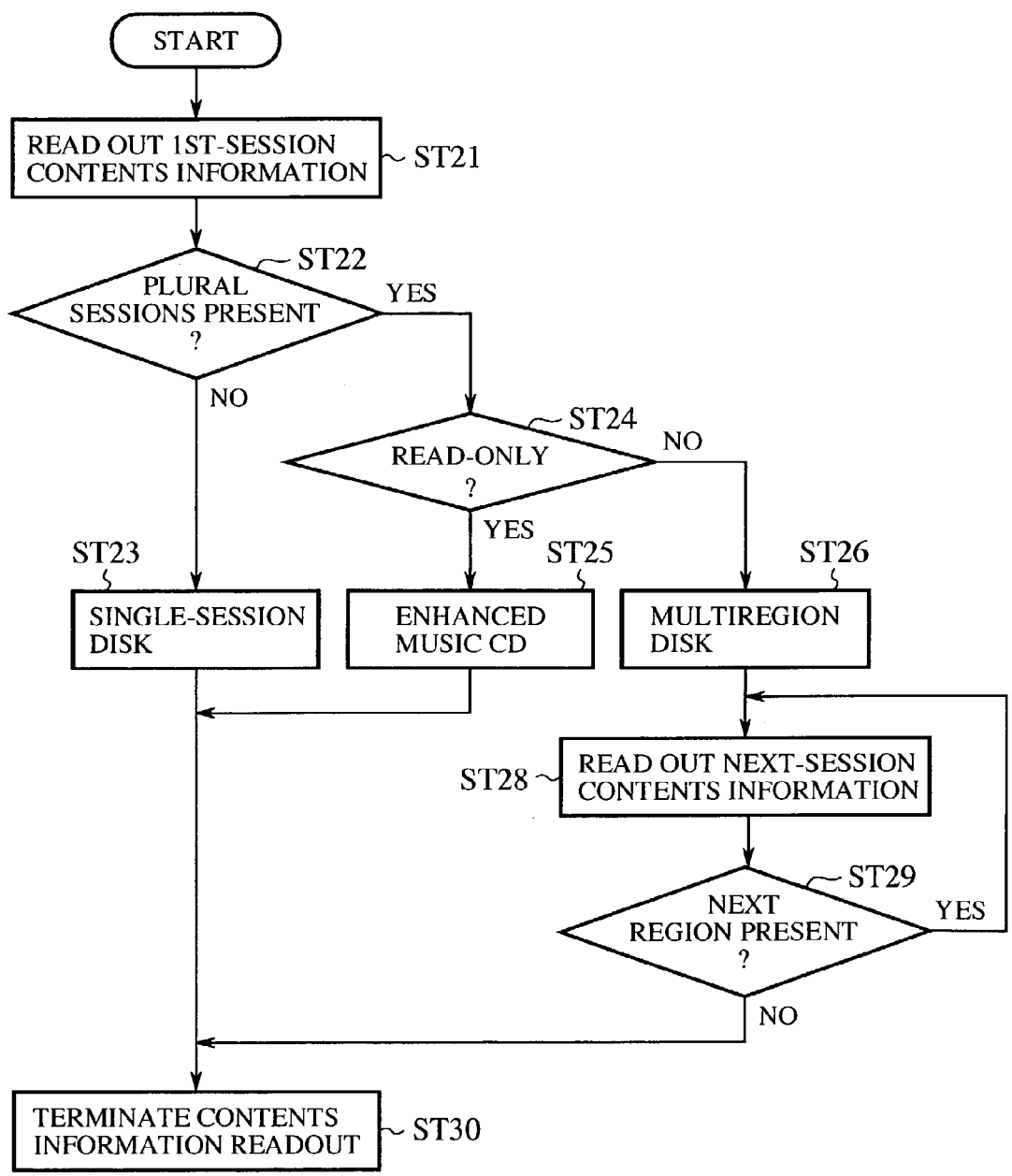
FIG. 7 is a flowchart to show the procedural steps of operation of the multisession compatible disk player according to embodiment 2 of the present invention.

FIG. 7 is a flowchart to show procedural steps of operation of the multisession compatible disk player according to embodiment 2 of the present invention. Steps ST21 to ST26 are the same as steps ST21 to ST26 in FIG. 5 to show the procedural steps of operation of embodiment 1.

When the disk type decision portion 7 decides in step ST23 in FIG. 7 that the disk 1 is a single session disk, the procedure goes to step ST30, in which the contents readout processing decision portion 8 decides that it is unnecessary to read out contents information in the subsequent sessions and causes the control portion 9 to terminate the contents information readout process, and the control portion 9 controls the playback of the program area on the disk 1.

When the disk type decision portion 7 decides in step ST25 that the disk 1 is an enhanced music CD, too, the procedure goes to step ST30, in which the contents readout processing decision portion 8 similarly decides that it is unnecessary to reads out the contents information in the subsequent sessions, and causes the control portion 9 to terminate the contents information readout process, and the control portion 9 controls the playback of the program area on the disk 1.

When the disk type decision portion 7 decides in step ST26 that the disk 1 is a multisession disk, the procedure goes to step ST28, in which the contents readout processing decision portion 8 obtains from the identification information processing portion 5 information about the next session contents information starting position and sends the information to the control portion 9, and the control portion 9 controls the signal readout portion 2 via the signal processing portion 3 to move to the next session contents information starting position and read out the next session contents information. And, as is the case with the readout of the contents information in the first session in step ST21, the signal processing portion 3 decodes the contents information and the identification information processing portion 5 identifies each piece of identification information contained in the decoded contents information.

In the case where based on the next session contents information starting position information identified by the identification information processing portion 5, the contents readout processing decision portion 8 decides in step ST29 that subsequent sessions are further present, steps ST28 and ST29 are repeated until no further subsequent sessions are present. When the contents readout processing decision portion 8 decides in step ST29 that the identification information processing portion 5 does not identify the next session contents starting position information and that no subsequent sessions are present, the procedure goes to step ST30, in which the contents readout processing decision portion 8 causes the control portion 9 to terminate the contents information readout process and the control portion controls the playback of the program area on the disk 1.

By deciding the multisession disk and the enhanced music CD in distinction from each other as described above, it is possible to read out the contents information of the enhanced music CD in the same manner as that for the single session disk and to start the playback of the former within about the same time as that for the latter.

As described above, according to embodiment 2, when the multisession decision portion 6 decides that the disk 1 has plural sessions and the disk format decision portion 10 decides that the disk is a read-only disk, the disk type decision portion 7 decides that the disk 1 is an enhanced music CD, then the contents readout processing decision portion 8 reads out the contents information in the first session alone and terminates the contents information readout process, and the control portion 9 controls the playback of the program area on the disk 1. With this scheme, the playback of the enhanced music CD can also be started within about the same time as that for an ordinary single session disk.

Embodiment 3

Figure 8:
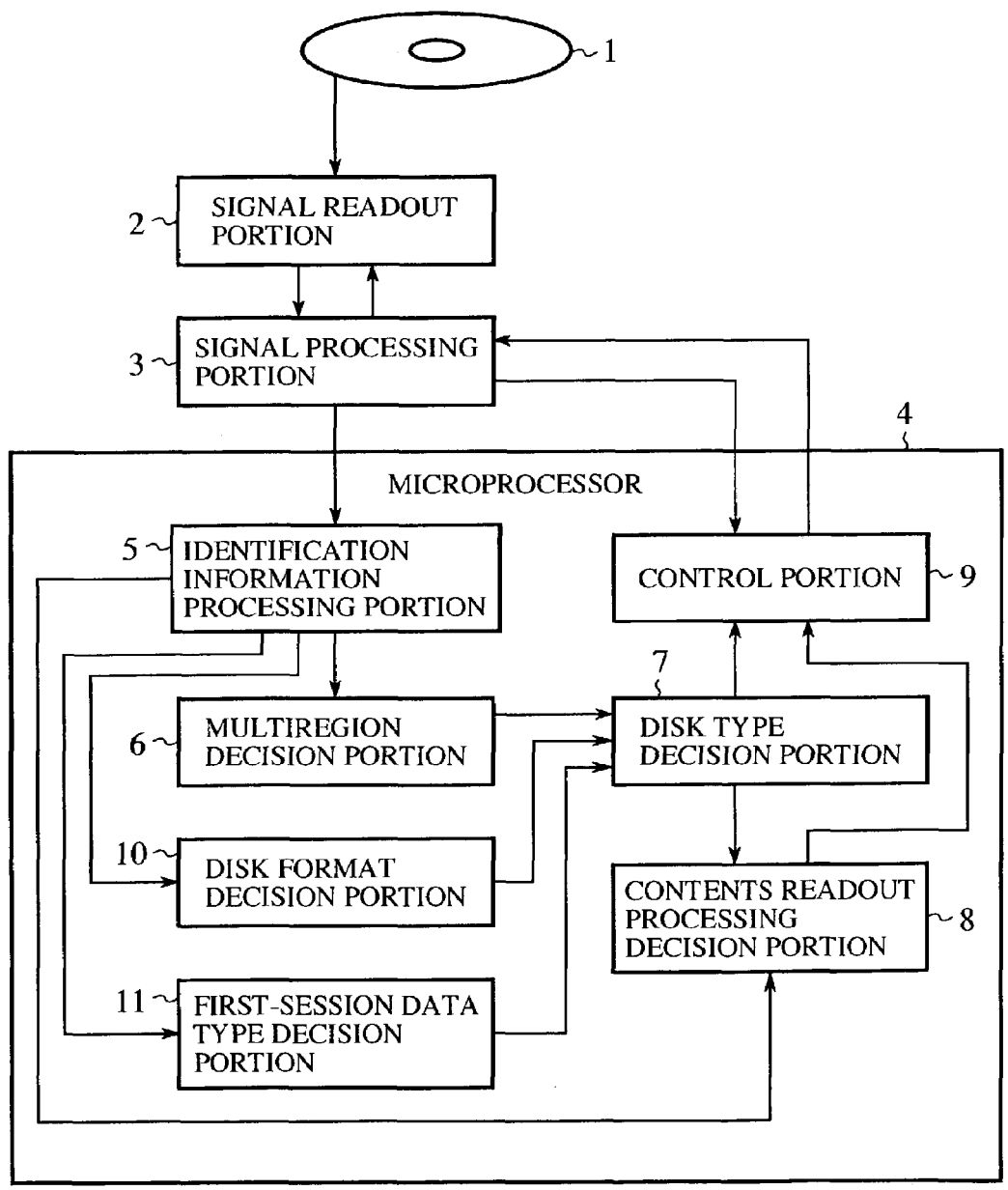
FIG. 8 is a block diagram to illustrate the configuration of a multisession compatible disk player according to embodiment 3 of the present invention.

FIG. 8 is a block diagram to illustrate the configuration of a multisession compatible disk player according to embodiment 3 of the present invention. In FIG. 8, reference numeral 11 denotes a first session data type decision portion that decides whether data recorded in the first session is music data or some other data based on that one piece of identification information identified by the identification information processing portion 5 which is the data type recorded in the lead-in area of the first session on the disk 1; the disk type decision portion 7 decides the type of the disk 1 based on the results of decision by the multisession decision portion 6, the disk format decision portion 10 and the first session data type decision portion 11. The other parts corresponding to those in embodiment 2 of FIG. 6 are identified by the same reference numerals.

Next, the operation of this embodiment will be described below.

Figure 9:
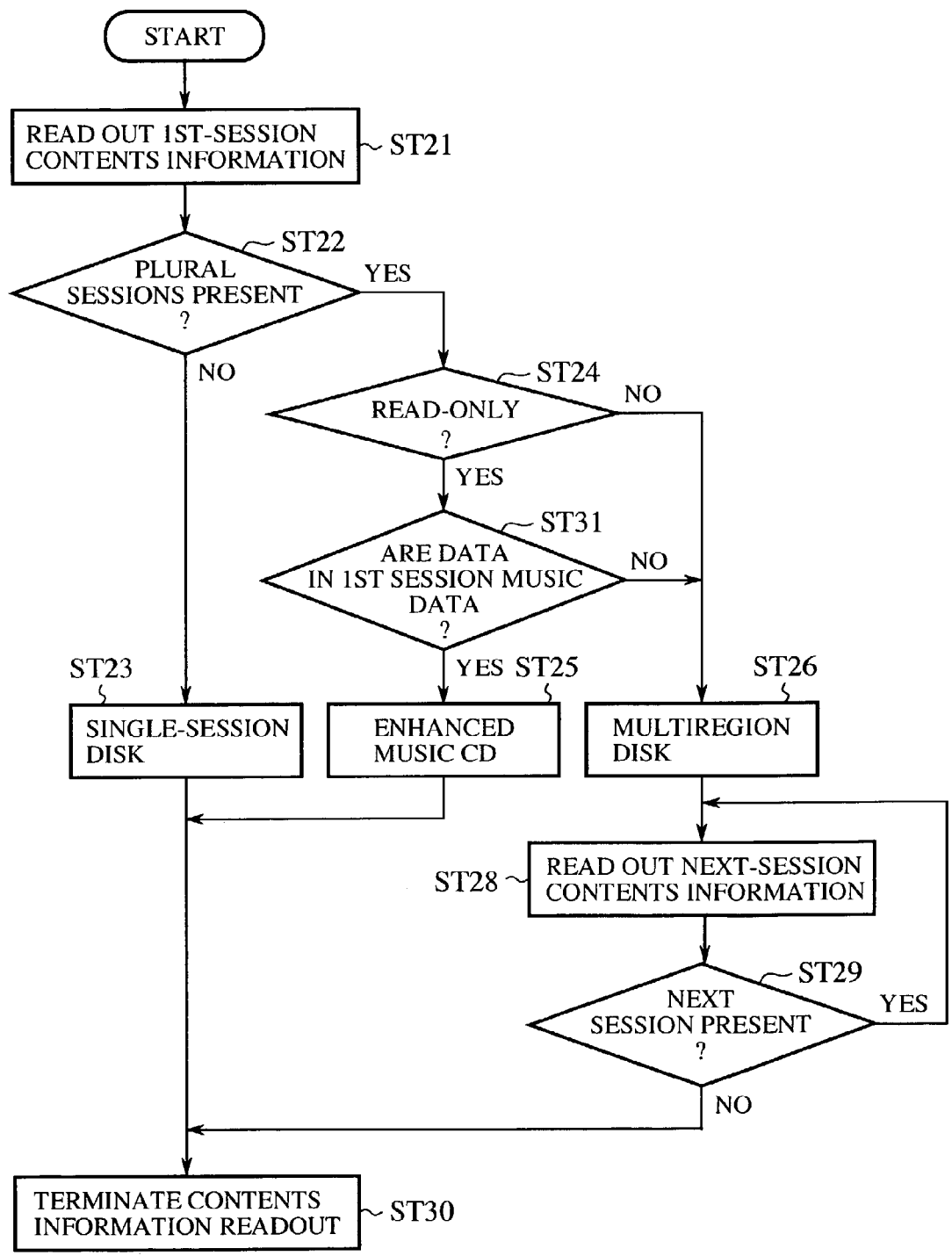
FIG. 9 is a flowchart to show the procedural steps of operation of the multisession compatible disk player according to embodiment 3 of the present invention.

FIG. 9 is a flowchart to show procedural steps of operation of the multisession compatible disk player according to embodiment 3 of the present invention. The illustrated flowchart has step ST31 added between steps ST24 and ST25 in embodiment 2 depicted in FIG. 7.

When the disk format decision portion 10 decides in step ST24 that the disk 1 is a read-only disk, the procedure goes to step ST31, in which the first session data type decision portion 11 decides whether data recorded in the first session is music data or some other data based on the data type in the identification information identified by the identification information processing portion 5 which is recorded in the lead-in area of the first session on the disk 1.

When the first session data type decision portion 11 decides in step ST31 that the data recorded in the first session is music data, the procedure goes to step ST25, in which the disk type decision portion 7 decides that the disk 1 is an enhanced music CD.

When the first session data type decision portion 11 decides in step ST31 that the data recorded in the first session is not music data but some other data, the procedure goes to step ST26, in which the disk type decision portion 7 decides that the disk is a read-only multisession disk other than the enhanced music CD, and the procedure goes to step ST28, in which to perform the same processing as in the case of the multisession disk in embodiment 2.

The other procedural steps of operation are identical with those in embodiment 2 shown in FIG. 7.

As described above, according to embodiment 3, in the case where the multisession decision portion 6 decides that the disk 1 has plural sessions, then the disk format decision portion 10 decides that the disk 1 is a read-only disk, and the first session data type decision portion 11 decides that the data recorded in the first session is music data, the disk type decision portion 7 decides that the disk 1 is an enhanced music CD, the contents readout processing decision portion 8 terminates the contents information readout process after reading out the first session contents information alone, and the control portion 9 controls the playback of the program area on the disk 1. With this scheme, the playback of the enhanced music CD can also be started within about the same time as that for an ordinary single session disk.

Further, according to embodiment 3 described above, when the first session data type decision portion 11 decides that the data recorded in the first session is not music data but some other data, the disk type decision portion 7 decides that the disk is not an enhanced music CD but a read-only multisession disk with some other data recorded in the first session, and the contents readout processing decision portion 8 causes the control portion 9 to read out the contents information of the next session. By this, it is possible to play back the read-only multisession disk in which the data recorded in the first session is not music data but some other data.

Incidentally, while in the above the present invention has been described as being applied to the multisession compatible CD player, it is needless to say that the invention is applicable as well to other players of the same data configuration as described above.

INDUSTRIAL APPLICABILITY

As described above, the multisession compatible disk player according to the present invention decides the enhanced music CD that is a multisession disk based on particular specifications based on the first session contents information read out during playback of the disk; hence, the player of the invention is capable of playing back such a disk in the same manner as that for the single session disk and starting its playback within about the same time as that needed for the latter.

What is claimed is:

1. A multisession compatible disk player characterized by the provision of:

a signal readout portion that reads out contents information containing identification information about the recording format of a disk recorded in a lead-in area of a first session on the disk;

a signal processing portion that decodes contents information read out by said signal readout portion;

an identification information processing portion that identifies each piece of the identification information contained in the contents information decoded by said signal processing portion;

a multisession decision portion that decides whether the disk has plural sessions based on a session format information in the identification information identified by the identification information processing portion which is recorded in the lead-in area of the first session on the disk;

a disk format decision portion that decides whether the disk is a read-only disk based on a disk format information in the identification information identified by said identification information processing portion which is recorded in the lead-in area of the first session on the disk;

a disk type decision portion that decides a type of the disk based on results of the decision by said multisession decision portion and said disk format decision portion; and a control portion that controls a playback of the disk based on a result of decision by said disk type decision portion.

2. The multisession compatible disk player as claimed in claim 1, characterized in that the disk format decision portion decides that the disk is a single session disk when the multisession decision portion decides that the disk has no plural sessions.

3. The multisession compatible disk player as claimed in claim 1, characterized in that the disk type decision portion decides that the disk is a disk based on particular specifications when the multisession disk decision portion decides that the disk has plural sessions and the disk format decision portion decides that the disk is a read-only disk.

4. The multisession compatible disk player as claimed in claim 3, characterized in that the disk type decision portion decides an enhanced music CD whose formats of respective sessions are identified as a disk based on particular specifications.

5. The multisession compatible disk player as claimed in claim 1, characterized in that the disk type decision portion decides that the disk is a multisession disk when the multisession decision portion decides that the disk has plural sessions and the disk format decision portion decides that the disk is not a read-only disk.

6. The multisession compatible disk player as claimed in claim 1, characterized by the provision of: a contents readout processing decision portion that causes the control portion to control a process for readout of contents information containing identification information, which is recorded in the second and subsequent sessions on the disk based on the result of decision by the disk type decision portion.

7. The multisession compatible disk player as claimed in claim 6, characterized in that when the multisession decision portion decides that the disk has no plural sessions, the disk format decision portion decides that the disk is a single session disk, and the contents readout processing decision portion decides that it is unnecessary to read out contents information in the subsequent sessions and causes the control portion to terminate the contents information readout process.

8. The multisession compatible disk player as claimed in claim 6, characterized in that when the multisession decision portion decides that the disk has plural sessions and the disk format decision portion decides that the disk is a read-only disk, the disk type decision portion decides that the disk is a disk based on particular specifications, and the contents readout processing decision portion decides that it is unnecessary to read out contents information in the subsequent sessions and causes the control portion to terminate the contents information readout process.

9. The multisession compatible disk player as claimed in claim 6, characterized in that when the multisession decision portion decides that the disk has plural sessions and the disk format decision portion decides that the disk is not a read-only disk, the disk type decision portion decides that the disk is a multisession disk and the contents readout processing decision portion causes the control portion to control the process for reading out contents information in the subsequent sessions.

10. The multisession compatible disk player as claimed in claim 6, characterized by the provision of: a first session data type decision portion that decides whether data recorded in the first session is music data or some other data based on a data type in the identification information identified by the identification information processing portion which is recorded in the lead-in area of the first session on the disk; wherein the disk type decision portion decides the type of the disk based on the result of decision by the multisession decision portion, the result of decision by the disk format decision portion and the result of decision by said first session data type decision portion.

11. The multisession compatible disk player as claimed in claim 10, characterized in that when the multisession decision portion decides that the disk has no plural sessions, the disk format decision portion decides that the disk is a single session disk and the contents readout processing decision portion decides that it is unnecessary to read out contents information in the subsequent sessions and causes the control portion to terminate the contents information readout process.

12. The multisession compatible disk player as claimed in claim 10, characterized in that the disk type decision portion decides that the disk is a disk based on particular specifications, and the contents readout processing decision portion decides that it is unnecessary to read out contents information in the subsequent sessions and causes the control portion to terminate the contents information readout process when the multisession decision portion decides that the disk has plural sessions, the disk format decision portion decides that the disk is a read-only disk, and the first session data type decision portion decides that data recorded in the first session is music data.

13. The multisession compatible disk player as claimed in claim 10, characterized in that the disk type decision portion decides that the disk is a read-only multisession disk, and the contents readout processing decision portion causes the control portion to control the process for reading out contents information in the subsequent sessions when the multisession decision portion decides that the disk has plural sessions, the disk format decision portion decides that the disk is a read-only disk, and the first session data type decision portion decides that data recorded in the first session is not music data but some other data.

* * * * *